July 20, 1937. J. SLEPIAN 2,087,742
BREAKABLE FILTER APPLIANCE FOR TOBACCO PIPES
Filed Dec. 15, 1934
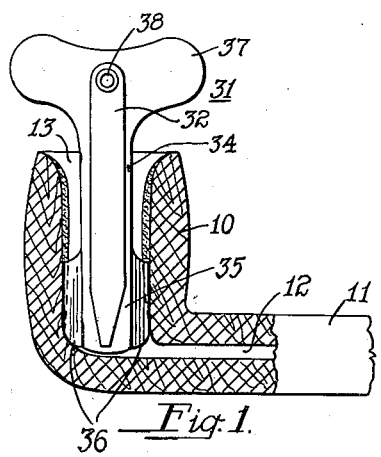
Fig. 1.
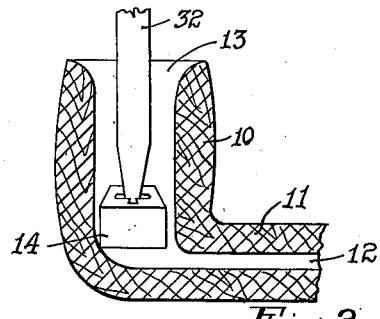
Fig. 2.
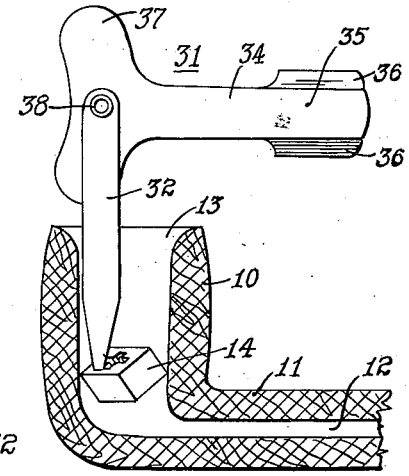
Fig. 4.
Fig. 3.
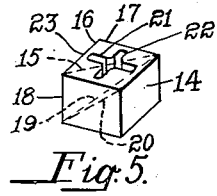
Fig. 5.
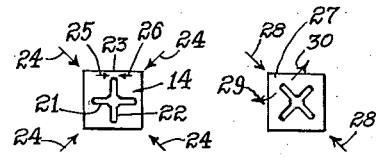
Fig. 6.   Fig. 7.   Fig. 8.
INVENTOR
Joseph Slepian
By O. B. Buchanan
Attorney Patented July 20, 1937

2,087,742

UNITED STATES PATENT OFFICE 2,087,742

BREAKABLE FILTER APPLIANCE FOR TOBACCO PIPES

Joseph Slepian, Pittsburgh, Pa.

Application December 15, 1934, Serial No. 757,626

11 Claims. (Cl. 131—12)

My invention relates to tobacco pipes, and it has particular relation to an improved breakable filter appliance therefor, consisting of a slotted, porous, absorbent plug or filter and a combined tool adapted both for reaming the pipe-bowl and for breaking the plug or filter in order to remove the same when it is dirty.

It is an object of my invention to provide a filter-plug which will have but few points of contact with the pipe-bowl, thereby protecting the wood of the bowl, as will be subsequently described, and avoiding the sharp taste characteristic of new wood pipes.

It is a further object of my invention to provide a filter-plug which will have very superior fitting-qualities, enabling it to have a wedging fit in all practical shapes and sizes of pipe-bowls.

A still further object of my invention is to provide a filter-plug having a perforation of such shape that the plug may be readily extruded from a clay mass, in the process of fabrication, and also of such shape as to yield a maximum strength against breakage during ordinary handling, or when inserting the plug in a pipe-bowl, but being readily breakable in response to a twisting force applied within the perforation by a special tool which forms a part of my invention.

A still further object of my invention is to provide an improved combination-tool having a breaker-element adapted to perform the breaking function just mentioned, and a reamer-element having advantages in reaming the pipe-bowl for the reception of my filter-plug, as will be subsequently described.

With the foregoing and other objects in view, my invention consists of the plugs, compositions, instruments, combinations and methods hereinafter described and claimed, and illustrated in the accompanying drawing, wherein Fig. 1 is a longitudinal sectional view of a tobacco-pipe bowl, with my reamer in place therein, to prepare the bowl to receive one of my filter-plugs;

Fig. 2 is a view showing one of my filter-plugs in place in the bowl of a small pipe, the latter being shown in phantom, and showing my tool in place for breaking the plug, in order to remove the same after a period of use;

Figs. 3 and 4 are views similar to Fig. 2, showing how the same plug is adaptable for large pipe-bowls, and for even extra-large pipe-bowls, and showing also how my tool may be used to wedge the plug into place;

Fig. 5 is a perspective view of the plug or filter; and

Figs. 6, 7 and 8 are plan views of plugs, illustrating the forces acting on different kinds of slots under different conditions, as will be set forth in my explanation of my invention.

In Figs. 1 to 4, I have shown a smoker's tobacco-pipe of ordinary construction, comprising a bowl 10 and a stem 11, the stem having a longitudinally extending hole or smoke-passage 12 therein, communicating with the bottom of the chamber 13 of the bowl 10.

In Fig. 5, I have shown one of my improved slotted, porous, absorbent plugs or filters 14 which is readily extruded from a die (not shown) and cut into individual plugs or sections, in the fabrication thereof, the material of construction being preferably clay which is baked to a suitable hardness after having been extruded from the die. The plug is nearly cubical in shape, being square in two of its faces, and oblong in the other four faces. Preferably, although not necessarily, the square is formed on the long side of the oblong, as shown. However, the square may be formed on the small side of the oblong, or the oblong may be square, which is the limiting rectangular shape. In other words, the essential feature is that the sides of the plug shall all be rectangular.

Figs. 2, 3 and 4 show three exemplary sizes of pipe-bowls. It will be found that most pipe-bowls are of about the same size, because they are adapted to have the tobacco tamped in with the finger, thus imposing a practical minimum limit, as well as a practical maximum limit, to the size of the bowl. The smallest pipe-bowl which is used to any considerable extent is that which is shown in Fig. 2, being about ⅝ths of an inch in diameter. A large size is that which is shown in Fig. 3, being about 0.67 inch in diameter. An unusually large pipe-bowl is shown in Fig. 4, being about 0.71 inch in diameter.

In order that my filter-plug 14 may wedge itself into any one of these three sizes of pipe, or in any intermediate size, its dimensions should be such that it will rest flatly in a five-eighths inch bowl, as shown in Fig. 2, while its longest diagonal must be slightly greater than the very largest bowl, as shown in Fig. 4. The diagonal of the square top and bottom sides or faces of my plug 14 is therefore fixed at 0.625 (⅝) inch, as shown at 15 in Fig. 5, which means that the horizontal edges or sides 16 and 17 must each be 0.442 inch or, say, approximately 0.44 inch. The height or thickness 18 of the plug 14 must furthermore be sufficient to make the long diagonal 19 of the solid figure slightly more than the largest diameter of pipe-bowl which the plug is to fit. As shown, my preferred size of plug 14 has a height 18 of 0.344 inch, or, say, approximately 0.34 inch, giving a long diagonal 19 of 0.713 inch.

For extremely small pipes, smaller than that shown in Fig. 2, the plug can be turned sideways, with two oblong faces for its top and bottom, respectively, in which case the limiting smallest sizes of pipe-bowl possible to accommodate with this size of plug 14 will have a diameter equal to the diagonal 20 of the oblong face in Fig. 5, which is 0.560 inch.

My plug 14 is preferably perforated, or provided with slots 21, 22 which are designed for easy breakage, but to have strength for permitting the plug to be pressed into the pipe-bowl without breaking the plug. I have found that the best form of perforation is that which comprises two slots 21 and 22, crossed in the form of a plus sign (+), the slots being parallel to the vertical walls of the plug, that is, parallel to the sides 16 and 17 of the square. While the slots pass all the way through the plug, from top to bottom, they do not extend as far as the side walls or the sides 16 or 17 of the square faces, leaving a bridge of material 23 at each end of each slot, which serves to materially strengthen the plug so as to avoid accidental breakage in handling or in inserting a plug in a pipe-bowl.

Referring to Fig. 6, the forces acting on the plug as it is being pressed into a pipe-bowl are represented by the four diagonal forces 24 on the four corners. It will be observed that the slots go to points 23 between the points (corners) where contact is made with the bowl and hence where pressure is applied to the plug. Thus the walls or bridges at the ends of the slots, at the points 23, are under compression, as indicated by the forces 25 and 26. As the clay material is much stronger in compression than in tension or in shearing, this positioning of the slots gives a maximum strength of the end-walls or bridges 23 at their ends.

If the slots had gone toward the corners of the square faces, that is, toward the points of contact with the bowl, leaving even a wide wall or bridge 27 at these corners, as shown in Fig. 7, two opposite, diagonally applied forces 28 from the pipe-bowl would produce a bending moment 29, 30 on the bridge 27, resulting in easy breakage of the plug when it is being inserted in a pipe-bowl.

While my crossed slots 21 and 22, parallel to the side faces, are, therefore, so placed that the piece of clay comprising my plug 14 is strongly resistant to forces applied to the corners, it will now be shown that my plug is easily broken by forces applied to the slots. In order to apply these breaking forces, I find it most convenient to provide a tool 31 having a breaker-element 32, shaped something like a screwdriver, which can be pressed lightly down into one of the slots 21 or 22 and given a slight twisting motion. The forces acting on the plug are indicated in Fig. 8, from which it will be seen that bending moments 33 are given to the bridges or walls 23 at the ends of the slots, and these bending moments are augmented by reason of the existence of two slots 21 and 22 at right angles to each other, dividing the face of the plug into four parts which are trying to turn in opposite directions.

My new shape of filter-plug 14 has the very distinct advantage of providing only a few points of contact with the pipe-bowl 10. The necessity for this feature will be apparent when it is understood that a cake, or deposit, from the combustion-products or residues of tobacco, after smoking, forms everywhere within the bowl except at the points of contact between the filter and the bowl. These areas, where there is no cake formed in the bowl, are undesirable, not only because the filter-plug does not wedge as firmly in place at these places as it does on the cake, so that the filter-plug is more likely to fall out when emptying the pipe, but also—and what is more serious—these uncoated spots of bare wood, if the bowl is made of wood, give off gases from the wood, due to the heat of the burning tobacco, causing a sharpness of taste, such as is characteristic of a new pipe. I have ascertained by test with small thermo-couples in the pipe-bowl, that the filter attains a high temperature, with a fast smoker, and I have measured a temperature as high as 160° C. at the point of contact between the filter and the bowl. This produces the objectionable wood-gases just mentioned, if these points of contact are not covered with a caked coating.

By the use of a square shape of filter-plug, it is not possible to have more than four edges of contact with the pipe-bowl. And usually, not edges or lines, but corners or points, are in contact, and the number of contacts is not four but only two or three. When my filter-plug is used, cake can form on the sides of the pipe-bowl, next to the filter-plug, thus protecting the wood, which is the usual material of construction of the bowl.

When a new filter-plug is inserted, new points of contact are made, so that there is always a protecting cake, which also provides a better anchorage for wedging-points than wood, as previously explained.

A triangular shape would not be as desirable as the square, because the spaces around a triangular filter would be too large, and the tobacco would drop into the same.

The square shape is most advantageous, also, in providing a good, wedging fit. If the cross-section of the filter-plug were circular, or nearly circular, such as hexagonal, it could fit in only one way, namely flat in the bowl, as shown in Fig. 2. If the bowl were slightly large, an approximately circular plug could not turn or tilt through an angle sufficient to wedge; and as it slightly turned, or wobbled, it would have so many points of contact that it would keep loosening those contacts which were doing the holding, and the plug would drop out when the bowl is inverted. If, however, plugs of a number of different sizes are provided, so as to accommodate pipe-bowls of different sizes, the square shape is not so important. In my preferred construction, I provide one size of plug which will have a wedging fit in practically any size of pipe, and will continue to fit the bowl regardless of its condition with respect to caking or reaming, within practical limits.

To obtain a good wedging fit, the trihedral angles of my filter-plug should not be obtuse. Pentagonal, hexagonal and greater-numbered polygonal shapes have trihedral angles which are not so sharp, and which do not wedge so well, as the rectangular shape of my preferred construction.

My filter-plug, for all its versatility in fitting pipe-bowls of different sizes, works best when the bowl is reamed out to a suitable size, from time to time, by means of the proper size of reamer, so as to keep the incrustations or caking within proper limits. And in this connection, I have found that, if a flat reamer 31 is used, that is, a two-dimensional reamer, having width and length but no material thickness, it must have a reduced shank 34, of less width than the reaming-edge portion 35, as shown in Fig. 1, so that the reamer-proper 35 is of materially less height, longitudinally of the shank, than the depth of the chamber 13 of the bowl 10. Otherwise the reamer would anchor at the top of the pipe-bowl and would tilt, so that it would not ream true, tending to gouge a hole too large for the plug. Preferably my reaming edges 36 are bent out a little, out of the plane of the shank 34, so as to produce more effective cutting-edges, although this is not essential.

In order to provide both a breaker 32 and a reamer 35 in a single tool, as shown in Fig. 1, I preferably pivot the breaker to the enlarged head-portion 37 of the shank 34 of the reamer, as indicated at 38 in Figs. 1 and 4.

From the foregoing, it will be observed that my absorbent clay plug 14 is of an approximately cubical shape, and that it fits in the bowl 10 of a pipe, and gathers all harsh, unpleasant elements from the smoke. I have found that it is highly selective in its action, in that the elements which it traps, in its millions of pores, are mainly the annoying elements, allowing the full flavor of the tobacco-smoke to pass through, perhaps because of the higher condensation-temperatures of these full-flavored elements of the smoke.

By making my filter-plug of fired clay, I not only provide a material which is brittle, in the sense that it will break under suitably applied forces, as distinguished from packing down into a compact, crumbly mass, like plaster of Paris, but I also provide a material which is itself free of obnoxious decomposition-products, as distinguished from filter-materials utilizing waterglass, or dissolved sodium silicate, as a binding-medium. My clay has the advantage, therefore, of being tasteless, preserving the full flavor of the tobacco; or, if desired, being tasteless itself, it affords a suitable medium for the introduction of flavoring or medicinal material, such as menthol, mint, wintergreen, or other substances.

When one is about to insert my absorbent filter-plug 14 into a pipe-bowl, it is best first to ream the bowl with my reamer 35, as shown in Fig. 1. One of my plugs is then inserted in the bowl and pressed down with a finger. Unless the bowl is very extremely small, smaller than five-eighths of an inch in diameter, the plug should be inserted flat-wise, with a square face uppermost, as shown in Fig. 2. In a small pipe, as shown in Fig. 2, the plug will lie flat and will hold securely, upon being simply pressed into place with the finger. In a large pipe, as shown in Fig. 3, the plug is first pushed down flat-wise as far as it will go, with the finger, and then it is pressed down on one side, either with the finger, or, as shown, with the breaker-member 32 of my combination-tool 31, and the plug will thereupon wedge tightly in the bowl. In an extra-large pipe, as shown in Fig. 4, instead of pressing down on one side, or edge, of the plug, one presses down on one corner, so that a tight, wedging fit may be obtained in pipe-bowls of a size up to the longest diagonal of the plug, or 0.713 inch. In using the breaker-tool 32 to press down on an edge or a corner, care must be taken to avoid poking the tool into one of the slots 21 or 22, as the plug would be easily broken by any forces exerted on the slots.

If the pipe-bowl is very extremely small, less than five-eights of an inch in diameter, my plug can still be used, although it is not really intended for such use, but it must be inserted small-end foremost, or with one of its oblong faces uppermost, and then tilted, as explained in connection with Fig. 3 or Fig. 4. In this way, small pipe-bowls can be accommodated, down to a minimum limiting diameter equal to the diagonal of the oblong face, or 0.560 inch.

One of my absorbent plugs in the bowl of a pipe will keep the pipe sweet, dry and clean. The tobacco will burn evenly and to the last flake. Soggy heel and juice will be banished. The smoke will be cool and pleasant to the smoker, and will not bite his tongue.

When the smoker desires to empty his pipe, when using one of my absorbent plugs, it is not necessary to bang or sharply knock the pipe in order to empty it. This is injurious to the pipe. Because of the clean, dry condition of the ash, and because all of the tobacco is burned, the ash can be easily shaken out of the pipe. However, because of the firm wedging action of my plug, it will not become displaced even if a sharp rap is given to the pipe-bowl in emptying it.

After one package of tobacco has been smoked, with one of my absorbent plugs in place in the pipe, the plug will become loaded and must be replaced. Usually it will be wedged so tightly that it cannot be removed in one piece. To remove the used plug, the tip of the breaker 32 is inserted in one of the slots, as shown in Fig. 2, and twisted. This will break the plug into pieces which can be loosened with the breaker and shaken out of the pipe. The bowl can then be re-reamed and will be ready for a fresh plug.

It will be noted that I have provided a plug which can be readily extruded, complete with its crossed slots, ready to be cut into "lengths" of 0.344 inch, equal to the height or thickness of the plug. Both the plug and the tool will be of trifling cost, and both will work together to provide a heretofore unattainable convenience and pleasure to the pipe-smoker.

My present invention is an improvement over that which is disclosed and claimed in my application Serial No. 725,685, filed May 15, 1934, wherein the broad features of the invention are claimed. It will be understood, of course, that while I prefer the precise shape and size of plug, and the design of tool, herein shown, my invention is not strictly limited thereto, in its broader aspects. I desire, therefore, that the appended claims shall be accorded the broadest construction consistent with their language and the prior art.

I claim as my invention:

1. An absorbent frangible pipe-bowl plug of polygonal shape, the walls of which have portions thereof spaced from the sides of the bowl, said plug having two crossed slots extending therethrough, from top to bottom, each slot terminating short of the side-walls of the plug, so as to leave a thin wall-bridge at each end of each slot to permit the plug to be readily broken upon the insertion of a suitable tool in a slot.

2. An absorbent frangible pipe-bowl plug having substantially square top and bottom faces, whereby there are spaces between the walls of the plug and the bowl, and having two crossed slots extending therethrough, from top to bottom, each slot being approximately parallel with two of the side-walls of the plug, and terminating short of the other two side-walls of the plug, so as to leave a thin wall-bridge at each end of each slot.

3. An absorbent pipe-bowl plug having an approximately cubical shape.

4. An absorbent pipe-bowl plug having dimensions of approximately 0.44 inch by 0.44 inch by 0.34 inch.

5. An absorbent pipe-bowl plug having square top and bottom faces approximately 0.44 inch by 0.44, and having a height slightly less than the length of a side of the square.

6. A polygonal-sectional absorbent pipe-bowl plug having no obtuse polyhedral angles.

7. An absorbent pipe-bowl plug having substantially square top and bottom faces, and having a height slightly less than the length of a side of the square.

8. An absorbent pipe-bowl plug having substantially square top and bottom faces, and having a height slightly less than the length of a side of the square, and having a slot extending therethrough, from top to bottom, said slot being approximately parallel with two of the side-walls of the plug, and terminating short of the other two side-walls of the plug, so as to leave a thin wall-bridge at each end of the slot to permit the plug to be readily broken upon the insertion of a suitable tool in the slot.

9. An absorbent pipe-bowl plug of such angular configuration that it contacts with the bowl at not more than four edges or corners.

10. An absorbent plug for substantially circular-sectioned pipe-bowls, said plug having diagonals of slightly different lengths across its top face, and from one top corner to an opposite bottom corner, whereby the plug may be wedged differently into different-sized pipe-bowls in a plurality of orientations about a horizontal axis.

11. An absorbent pipe-bowl plug having an angular configuration and having sufficient depth to cause its diagonal between oppositely positioned top and bottom corners to be slightly larger than its diagonal across its bottom face, whereby the plug will catch and hold on oppositely positioned top and bottom edges or corners when the plug is tilted and wedged in a large pipe-bowl.

JOSEPH SLEPIAN.